United States Patent
Koseki et al.

(10) Patent No.: US 10,404,202 B2
(45) Date of Patent: Sep. 3, 2019

(54) ELECTRONIC CONTROL DEVICE AND CONTROL METHOD THEREOF

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP); Fumiya Iijima, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/083,845

(22) PCT Filed: Aug. 8, 2016

(86) PCT No.: PCT/JP2016/073267
§ 371 (c)(1),
(2) Date: Sep. 19, 2018

(87) PCT Pub. No.: WO2017/158861
PCT Pub. Date: Sep. 21, 2017

(65) Prior Publication Data
US 2019/0089288 A1    Mar. 21, 2019

(30) Foreign Application Priority Data

Mar. 17, 2016 (JP) ................................ 2016-053517

(51) Int. Cl.
*G01R 31/02* (2006.01)
*H02H 3/04* (2006.01)
(Continued)

(52) U.S. Cl.
CPC ...... *H02P 29/0241* (2016.02); *H02M 7/5395* (2013.01); *H02P 5/74* (2013.01);
(Continued)

(58) Field of Classification Search
CPC .......................... H02P 29/0241; H02P 29/032
(Continued)

(56) References Cited

U.S. PATENT DOCUMENTS

2013/0257332 A1    10/2013   Nakano et al.
2014/0253006 A1     9/2014   Satou et al.
(Continued)

FOREIGN PATENT DOCUMENTS

JP    2011-152027 A    8/2011
JP    2013-207975 A    10/2013
(Continued)

*Primary Examiner* — Erick D Glass
(74) *Attorney, Agent, or Firm* — Foley & Lardner LLP

(57) ABSTRACT

Provided is an electronic control device including inverter circuits of first and second systems for driving a multiphase motor with first and second coil sets by use of upper and lower arm switching elements selectively controlled to be ON/OFF in each coil of the first and second coil sets. The upper arm switching elements of all phases in the inverter circuit of the first system are turned ON to apply a high potential to the first coil set, and the lower arm switching elements of all phases in the inverter circuit of the second system are turned ON to control the second coil set to a low potential. When a value of current flowing through the lower arm switching element in the inverter circuit of the second system is a predetermined value or more, it is determined that a power supply failure has occurred between the first and second systems.

20 Claims, 14 Drawing Sheets

(51) Int. Cl.
*H02H 7/08* (2006.01)
*H02K 11/00* (2016.01)
*H02P 29/024* (2016.01)
*H02P 25/22* (2006.01)
*H02P 27/08* (2006.01)
*H02P 29/028* (2016.01)
*H02P 29/032* (2016.01)
*H02M 7/5395* (2006.01)
*H02P 5/74* (2006.01)

(52) U.S. Cl.
CPC .............. *H02P 25/22* (2013.01); *H02P 27/08* (2013.01); *H02P 29/028* (2013.01); *H02P 29/032* (2016.02)

(58) Field of Classification Search
USPC ........................................................ 318/490
See application file for complete search history.

(56) References Cited

U.S. PATENT DOCUMENTS

2017/0346436 A1* 11/2017 Hara ..................... H02P 29/032
2019/0023315 A1* 1/2019 Takizawa ................. H02P 6/28
2019/0077449 A1* 3/2019 Wada ................... B62D 5/0481

FOREIGN PATENT DOCUMENTS

JP   2014-176229 A   9/2014
JP   2015-173554 A   10/2015

* cited by examiner

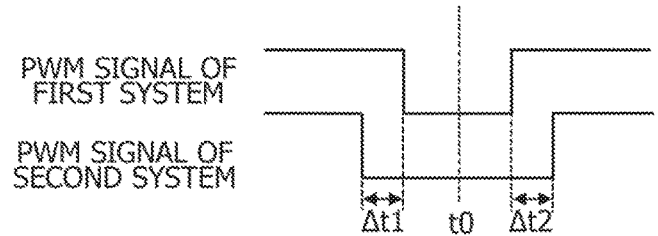
FIG.8A
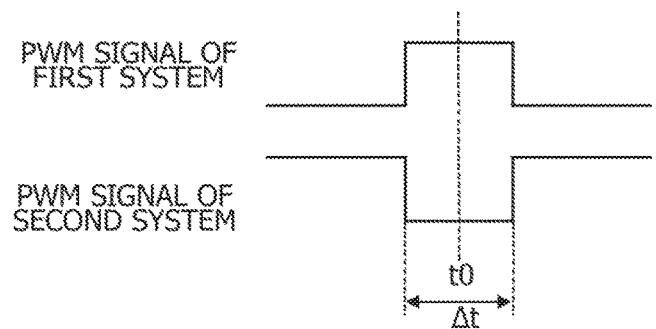
FIG.8B
FIG.9
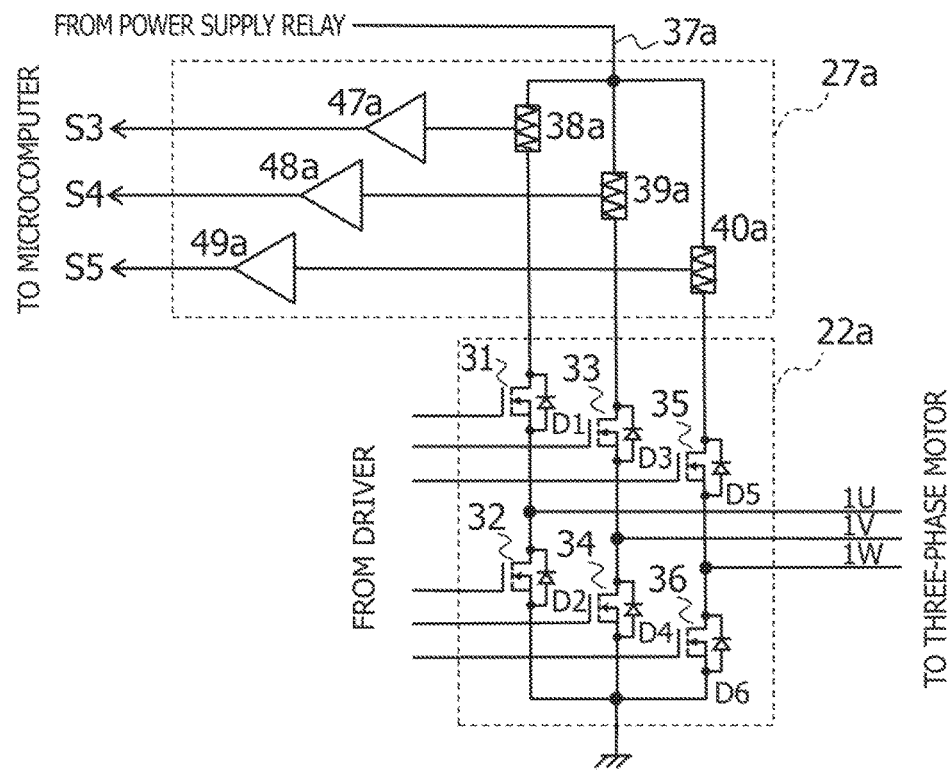

ELECTRONIC CONTROL DEVICE AND CONTROL METHOD THEREOF

TECHNICAL FIELD

The present invention relates to an electronic control device for driving a multiphase motor including plural coil sets and relates to a control method thereof. The control device and method are used, for example, for an electric power steering (EPS) devices or for steer-by-wire motor control.

BACKGROUND ART

To give a common, conventional measure taken when a failure occurs in an EPS device, assisted steering is stopped and shifted to manual steering. Along with increase in vehicle size, however, sudden shift to the manual steering is said to be dangerous, and there is a growing demand to prevent sudden stop of the assisted steering during driving.

With a view to responding to such a demand, in the system configuration of Patent Document 1, for example, the provision of two systems for inverters that drive a motor can cover a failure of one system. In this system that drives the motor with plural coil sets by use of inverters of plural systems, in case of intersystem short-circuit (short-circuit between phase lines or in the motor, etc.), outputs of the respective systems interfere with one another. This hinders desired control of power supply to the motor.

To overcome the above defect, Patent Document 2 discloses setting different voltage values for a center voltage of a pulse width modulation (PWM) signal output from an inverter of a first system and that output from an inverter of a second system so as to provide a potential difference between them to allow a larger amount of current to flow from the inverter of the first system to the inverter of the second system upon intersystem short-circuit. Consequently, the sum of current detection values in three phases, which is basically "0", deviates from zero, by which it can be determined that an intersystem short-circuit has occurred.

REFERENCE DOCUMENT LIST

Patent Documents

Patent Document 1: JP 2011-152027 A
Patent Document 2: JP 2014-176229 A

SUMMARY OF THE INVENTION

Problem to be Solved by the Invention

A short-circuit current not flowing through motor coils has a pulsed waveform. This leads to a problem that a failure cannot be detected unless the current is detected at a moment when a potential difference appears between PWM outputs. For example, regarding a downstream shunt system, current is generally detected for A/D conversion at the midpoint of a low output period. In this case, no potential difference appears between the systems, a short-circuit current cannot be detected. Thus, a current value has to be A/D converted within a short period that a potential difference is generated between a PWM pulse of the first system and that of the second system. This increases a load on a microcomputer (CPU) as a controller.

The present invention has been made in view of the above circumstances and accordingly, an object of the present invention is to provide an electronic control device and a control method thereof, which can detect an intersystem short-circuit without increasing a processing load on a controller.

Means for Solving the Problem

The present invention provides an electronic control device comprising: a motor including multiphase coil sets of first and second systems; inverter circuits of the first and second systems, including upper arm switching elements and lower arm switching elements which are provided for each of phases of the multiphase coil sets of the first and second systems of the motor and selectively controlled to be ON/OFF; and a controller for controlling inverter circuits of the first and second systems, which turns ON the upper arm switching elements or lower arm switching elements of all phases in the inverter circuit of the first system and turns ON the lower arm switching elements or upper arm switching elements of all phases in the inverter circuit of the second system while determining whether a power supply failure has occurred between the first and second systems based on a value of current flowing through the lower arm switching element or upper arm switching element in the inverter circuit of the second system.

Also, the present invention provides a control method for an electronic control device including a motor including multiphase coil sets of first and second systems, and inverter circuits of the first and second systems, including upper arm switching elements and lower arm switching elements which are provided for each of phases of the multiphase coil sets of the first and second systems of the motor and selectively controlled to be ON/OFF, the method comprising the steps of: turning ON the upper arm switching elements or lower arm switching elements of all phases in the inverter circuit of the first system and turning ON the lower arm switching elements or upper arm switching elements of all phases in the inverter circuit of the second system; detecting a value of current flowing through the lower arm switching element or upper arm switching element in the inverter circuit of the second system; and determining whether a power supply failure has occurred between the first and second systems based on the detected value of current.

Effects of the Invention

According to the present invention, the upper arm switching elements (or the lower arm switching elements) of all phases in the inverter circuit of the first system are turned ON to apply a high potential to the first coil set (or control the first coil set to be at a low potential) and the lower arm switching elements (or the upper arm switching elements) of all phases in the inverter circuit of the second system are turned ON to control the second coil set to be at a low potential (or apply a high potential to the second coil set). In this state, it is determined whether a power supply failure has occurred between the first and second systems based on a value of current flowing through the lower arm switching element (or the upper arm switching element) of the inverter circuit of the second system, whereby an intersystem short-circuit can be detected without increasing a processing load on the controller.

BRIEF DESCRIPTION OF THE DRAWINGS

FIG. 8A is a waveform chart illustrating a result of comparing a PWM signal of a first system and that of a second system in a conventional technique.

FIG. 8B is a waveform chart illustrating a result of comparing a PWM signal of a first system and that of a second system according to the present invention.

FIG. 9 is a circuit diagram illustrating another configuration example of the inverter circuit of the first system and the current detecting circuit of FIG. 1.

MODE FOR CARRYING OUT THE INVENTION

Figure 1:
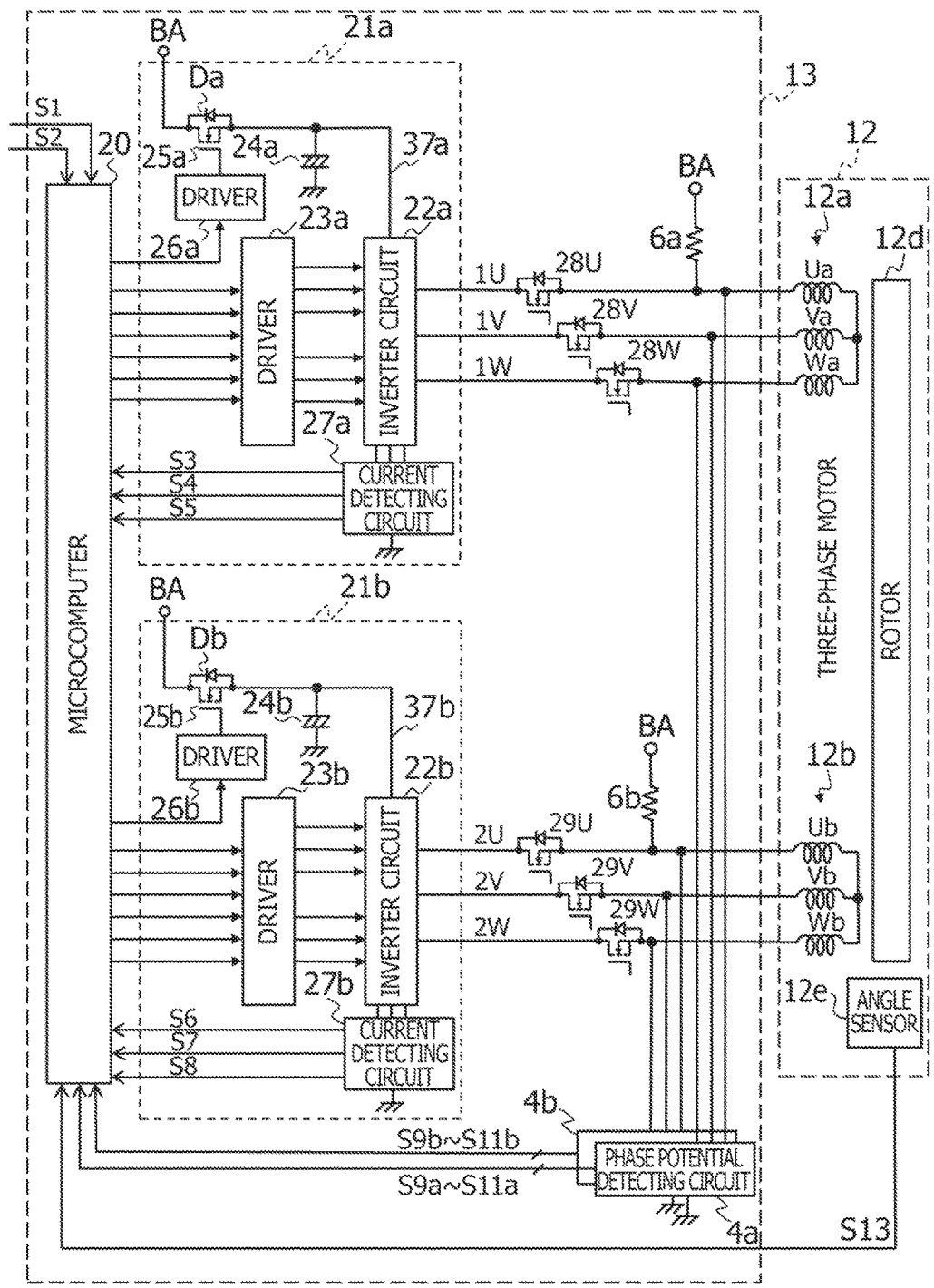
FIG. 1 is a circuit diagram illustrating a configuration example of an electronic control device according to a first embodiment of the present invention.

Embodiments of the present invention are described below with reference to the accompanying drawings.

First Embodiment

FIGS. 1 to 4 illustrate a configuration example of an electronic control device according to a first embodiment of the present invention. FIG. 5 is a schematic diagram of an EPS device to which this electronic control device is applied. First, the EPS device is described briefly. Next, described is an electronic control device for controlling a multiphase motor that assists steering force in the EPS device.

As illustrated in FIG. 5, the EPS device is composed of a steering wheel 10, a steering torque detecting sensor 11, an assisting multiphase motor 12, an electronic control device 13 for controlling multiphase motor 12, and the like. Also, steering torque detecting sensor 11 and a reducer 16 are disposed in a steering column 15 that houses a steering shaft 14.

Steering torque detecting sensor 11 detects steering torque that acts on steering shaft 14 during the driver's steering operation, and electronic control device 13 controls driving of multiphase motor 12 based on a steering torque signal S1, a vehicle speed signal S2, etc., so that multiphase motor 12 can generate steering assist force according to a driving state of the vehicle. When a pinion gear 17 provided on a tip end of steering shaft 14 is rotated thereby, a rack shaft 18 moves horizontally to the right or left in a travel direction. Thus, the driver's steering operation is transmitted to a wheel (tire) 19 to turn the vehicle in a desired direction.

Next, referring to FIGS. 1 to 4, the electronic control device according to the first embodiment of the present invention is described in more detail. As illustrated in FIG. 1, multiphase (in this example, three-phase) motor 12 includes first and second coil sets (muntiphase coil sets of the first and second systems) 12a, 12b. First coil set 12a includes a U-phase coil Ua, a V-phase coil Va, and a W-phase coil Wa. Second coil set 12b includes a U-phase coil Ub, a V-phase coil Vb, and a W-phase coil Wb. The coil sets 12a, 12b can be separately driven by a drive circuit 21a in a first system of electronic control device 13 and a drive circuit 21b in a second system thereof, respectively. Three-phase motor 12 has a rotor 12d equipped with an angle sensor 12e. A signal (angle detection signal) S13 corresponding to a rotational angle of rotor 12d detected by angle sensor 12e is input to a microcomputer (CPU) 20.

Drive circuit 21a of the first system is composed of an inverter circuit 22a, a driver 23a for inverter circuit 22a, a capacitor 24a, a power supply relay (semiconductor relay) 25a, a driver 26a for power supply relay 25a, a current detecting circuit 27a, and the like. Drive circuit 21a is controlled by microcomputer 20. Microcomputer 20 can also function as a diagnosis apparatus for detecting a failure. In this example, drive lines (current supply paths) 1U, 1V, 1W between drive circuit 21a and U-phase coil Ua, V-phase coil Va, and W-phase coil Wa of three-phase motor 12 are provided with phase relays 28U, 28V, 28W that serve as a power supply cutoff element.

A power supply line 37a of inverter circuit 22a is connected to a battery (power supply) BA via power supply relay 25a. Capacitor 24a is connected between power supply line 37a and a ground point. Capacitor 24a assists power supply from battery BA to inverter circuit 22a and also, eliminates noise components such as surge current. As power supply relay 25a, an N-channel MOSFET including a parasitic diode Da is used.

Driver 23a includes H-side driver units corresponding to upper arm switching elements (upstream drive elements) and L-side driver units corresponding to lower arm switching elements (downstream drive elements), which are configured to drive U, V and W phases of inverter circuit 22a. Output terminals of the respective H-side driver units are connected to control terminals of the upper arm switching elements, and microcomputer 20 executes selective ON/OFF control thereof. Also, output terminals of the respective L-side driver units are connected to control terminals of the lower arm switching elements, and microcomputer 20 executes selective ON/OFF control thereof. Furthermore, an output terminal of driver 26a is connected to a gate of the N-channel MOSFET that functions as power supply relay 25a, and microcomputer 20 executes selective ON/OFF control thereof.

Outputs of inverter circuit 22a are supplied from drive lines 1U, 1V, 1W to U-phase coil Ua, V-phase coil Va, and W-phase coil Wa of coil set 12a through drain and source regions of N-channel MOSFETs that function as phase relays 28U, 28V, 28W, respectively. Although not illustrated, phase relays 28U, 28V, 28W are selectively controlled to be ON/OFF by microcomputer 20 to supply current between inverter circuit 22a and coil set 12a or cut off current supply therebetween. In the MOSFETs as phase relays 28U, 28V, 28W, a parasitic diode is formed in a forward direction from the source to the drain.

Connected between U-phase drive line 1U and battery BA is a pull up resistor 6a that functions as a potential applying circuit for applying and holding an intermediate potential to drive line 1U. Pull up resistor 6a is configured to apply an intermediate potential between a voltage of battery BA and the ground potential to U-phase drive line 1U. In a typical example discussed herein, U-phase drive line 1U is connected to pull up resistor 6a but it can be connected to V-phase drive line 1V or W-phase drive line 1W. Phase potentials of drive lines 1U, 1V, 1W are detected by a phase potential detecting circuit 4a and the detection result is input to microcomputer 20.

Likewise, drive circuit 21b of the second system is composed of an inverter circuit 22b, a driver 23b for inverter circuit 22b, a capacitor 24b, a power supply relay (semiconductor relay) 25b, a driver 26b for power supply relay 25b, current detecting circuit 27b, and the like. Drive circuit 21b is controlled by microcomputer 20. Drive lines (current supply paths) 2U, 2V, 2W between drive circuit 21b and U-phase coil Ub, V-phase coil Vb, and W-phase coil Wb of three-phase motor 12 are equipped with phase relays 29U, 29V, 29W that function as a power supply cutoff element.

Inverter circuit 22b has a power supply line 37b connected to battery BA via power supply relay 25b. Capacitor 24b is connected between power supply line 37b and the ground point. Capacitor 24b assists power supply from battery BA to inverter circuit 22b and eliminates noise components such as surge current. As power supply relay 25b, an N-channel MOSFET including a parasitic diode Db is used.

Driver 23b includes H-side driver units corresponding to upper arm switching elements (upstream drive elements) for driving the U, V and W phases of inverter circuit 22b, and L-side driver units corresponding to lower arm switching elements (downstream drive elements) thereof. Output terminals of the respective H-side driver units are connected to control terminals of the upper arm switching elements and selectively controlled to be ON/OFF by microcomputer 20. Also, output terminals of the respective L-side driver units are connected to control terminals of the lower arm switching elements, and microcomputer 20 executes selective ON/OFF control thereof. Furthermore, an output terminal of driver 26b is connected to a gate of the N-channel MOSFET that functions as power supply relay 25b, and microcomputer 20 executes selective ON/OFF control thereof.

An output of inverter circuit 22b is supplied from drive lines 2U, 2V, 2W to U-phase coil Ub, V-phase coil Vb, and W-phase coil Wb of coil set 12b through drain and source regions of N-channel MOSFETs that function as phase relays 29U, 29V, 29W. Although not illustrated, phase relays 29U, 29V, 29W are selectively controlled to be ON/OFF by microcomputer 20 similar to phase relays 28U, 28V, 28W, to thereby supply current between inverter circuit 22b and coil set 12b or cut off the current supply. In the MOSFETs as phase relays 29U, 29V, 29W, a parasitic diode is formed in a forward direction from the source to the drain.

Connected between U-phase drive line 2U and battery BA is a pull up resistor 6b for applying and holding an intermediate potential to drive line 2U. Pull up resistor 6b applies an intermediate potential between voltage of battery BA and the ground potential to U-phase drive line 2U. In a typical example discussed herein, U-phase drive line 2U is connected to pull up resistor 6b, but it can be connected to V-phase drive line 2V or W-phase drive line 2W. Phase potentials of drive lines 2U, 2V 2W are detected by a phase potential detecting circuit 4b and the detection result is input to microcomputer 20.

Microcomputer 20 as a main controller receives steering torque signal S1 and vehicle speed signal S2 from the EPS device, and also receives detection signals S3 to S8 of current detecting circuits 27a, 27b in electronic control device 13, signals S9a to S11a and signals S9b to S11b corresponding to phase potentials detected by phase potential detecting circuits 4a, 4b, and the like. Also, microcomputer 20 receives an angle detection signal S13 from angle sensor 12e provided in three-phase motor 12. Microcomputer 20 determines whether a short-circuit failure has occurred between coil sets 12a and 12b or between inverter circuits 22a and 22b based on signals S3 to S8, S9a to S11a, S9b to S11b, S12a, S12b, etc. Then, if no short-circuit failure has occurred, microcomputer 20 controls drive circuits 21a and 21b based on signals S1, S2, S13, etc. to drive three-phase motor 12, so as to generate steering assist force according to a running state of a vehicle.

Figure 2:
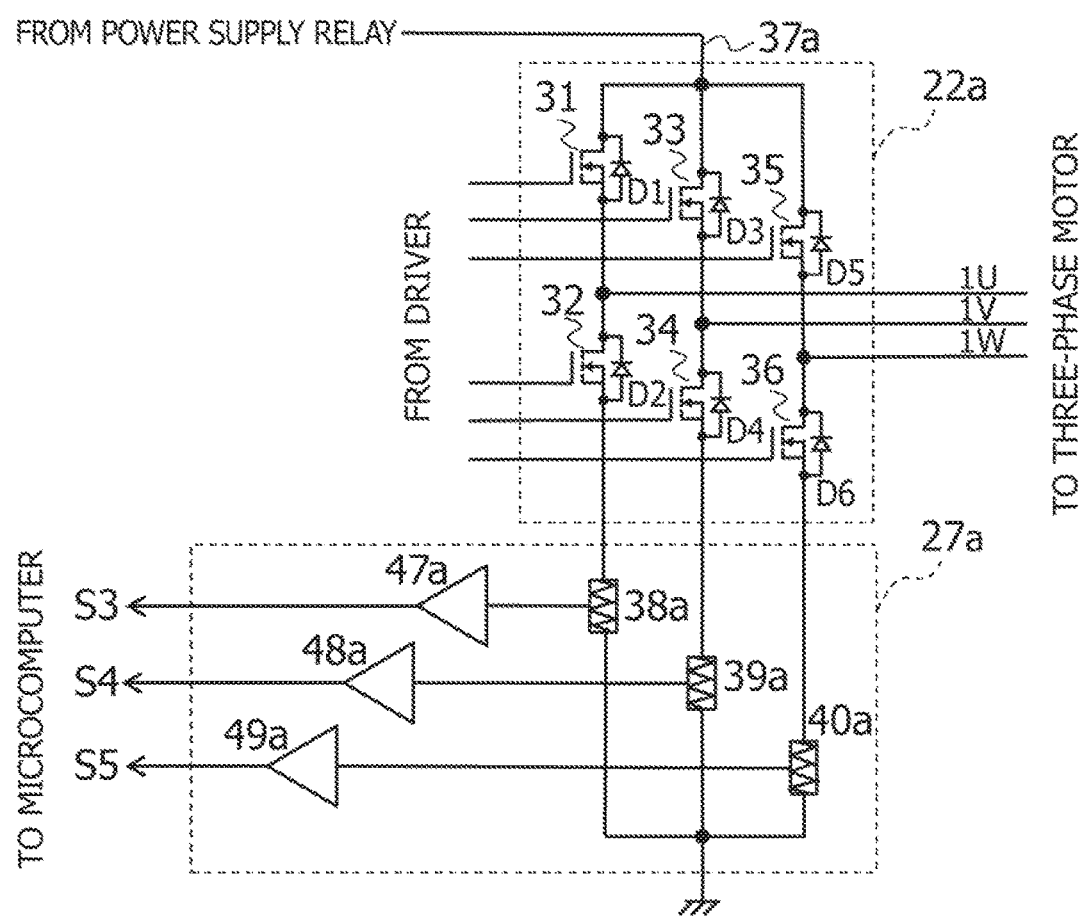
FIG. 2 is a circuit diagram illustrating a configuration example of an inverter circuit of a first system and a current detecting circuit of FIG. 1.

FIG. 2 illustrates a configuration example of inverter circuit 22a and current detecting circuit 27a of FIG. 1. Inverter circuit 22a has three-phase bridge circuit configuration with three sets of switching elements for driving U-phase coil Ua, V-phase coil Va, and W-phase coil Wa of three-phase motor 12 on a phase basis via drive lines 1U, 1V, 1W. In this example, the switching elements are configured by N-channel MOSFETs 31 to 36. Current detecting circuit 27a is composed of current detecting resistors 38a to 40a that function as a current detecting element, and buffers 47a to 49a for amplifying voltages (corresponding to currents flowing through the three-phase bridge circuit) detected by current detecting resistors 38a to 40a.

In MOSFETs 31, 32, drain and source regions are series-connected between power supply line 37a and one end of current detecting resistor 38a, and their common node is connected to one end of drive line 1U. In MOSFETs 33, 34, drain and source regions are series-connected between power supply line 37a and one end of current detecting resistor 39a, and their common node is connected to one end of drive line 1V. In MOSFETs 35 and 36, drain and source regions are series-connected between power supply line 37a and one end of current detecting resistor 40a, and their common node is connected to one end of drive line 1W.

The other ends of current detecting resistors 38a to 40a are connected to a negative terminal of the power supply and thus grounded, and voltages detected by current detecting resistors 38a to 40a are input to buffers 47a to 49a. Outputs of buffers 47a to 49a are input to microcomputer 20 as detection signals S3 to S5 (U-phase current detection value Uai, V-phase current detection value Vai, and W-phase current detection value Wai) corresponding to currents flowing through inverter circuit 22a.

Note that diodes D1 to D6 connected in the forward direction between the source and drain in MOSFETs 31 to 36 are parasitic diodes.

Figure 3:
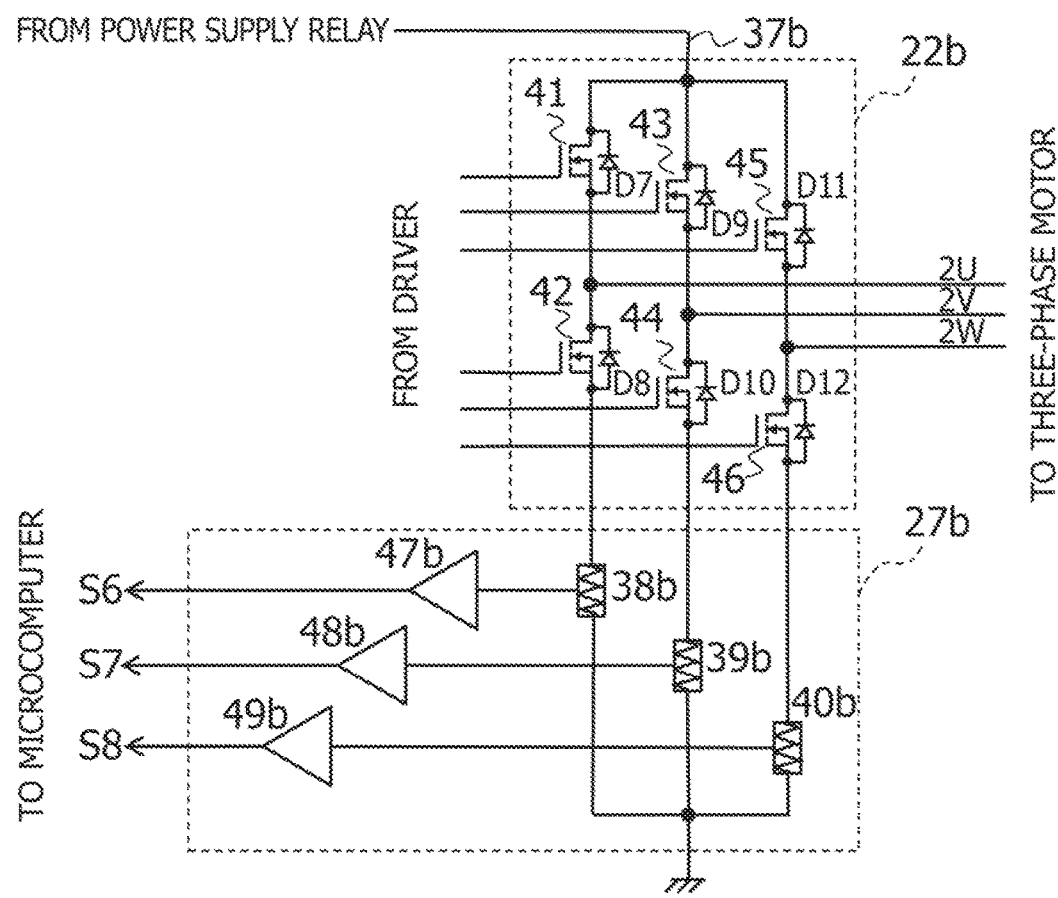
FIG. 3 is a circuit diagram illustrating a configuration example of an inverter circuit of a second system and a current detecting circuit of FIG. 1.

FIG. 3 illustrates a configuration example of inverter circuit 22b and current detecting circuit 27b of FIG. 1. Inverter circuit 22b has the same circuit configuration as inverter circuit 22a, i.e., has three-phase bridge circuit configuration with three sets of switching elements for driving U-phase coil Ub, V-phase coil Vb, and W-phase coil Wb of three-phase motor 12 on a phase basis via drive lines 2U, 2V, 2W. Similar to the above, the switching elements are configured by N-channel MOSFETs 41 to 46. Also, current detecting circuit 27b is composed of current detecting resistors 38b to 40b and buffers 47b to 49b for amplifying voltages (corresponding to currents flowing through the three-phase bridge circuit) detected by current detecting resistors 38b to 40b, similar to current detecting circuit 27a.

In MOSFETs 41, 42, drain and source regions are series-connected between power supply line 37b and one end of current detecting resistor 38b, and their common node is connected to one end of drive line 2U. In MOSFETs 43, 44, drain and source regions are series-connected between power supply line 37b and one end of current detecting resistor 39b, and their common node is connected to one end of drive line 2V. In MOSFETs 45, 46, drain and source regions are series-connected between power supply line 37b and one end of current detecting resistor 40b, and their common node is connected to one end of drive line 2W.

The other ends of current detecting resistors 38b to 40b are grounded, and voltages detected by current detecting resistors 38b to 40b are applied to buffers 47b to 49b, respectively. Outputs of buffers 47b to 49b are input to microcomputer 20 as detection signals S6 to S8 (U-phase current detection value Ubi, V-phase current detection value Vbi, and W-phase current detection value Wbi) corresponding to currents flowing through inverter circuit 22b.

Diodes D7 to D12 connected in the forward direction between the source and drain in MOSFET 41 to 46 are parasitic diodes.

Figure 4:
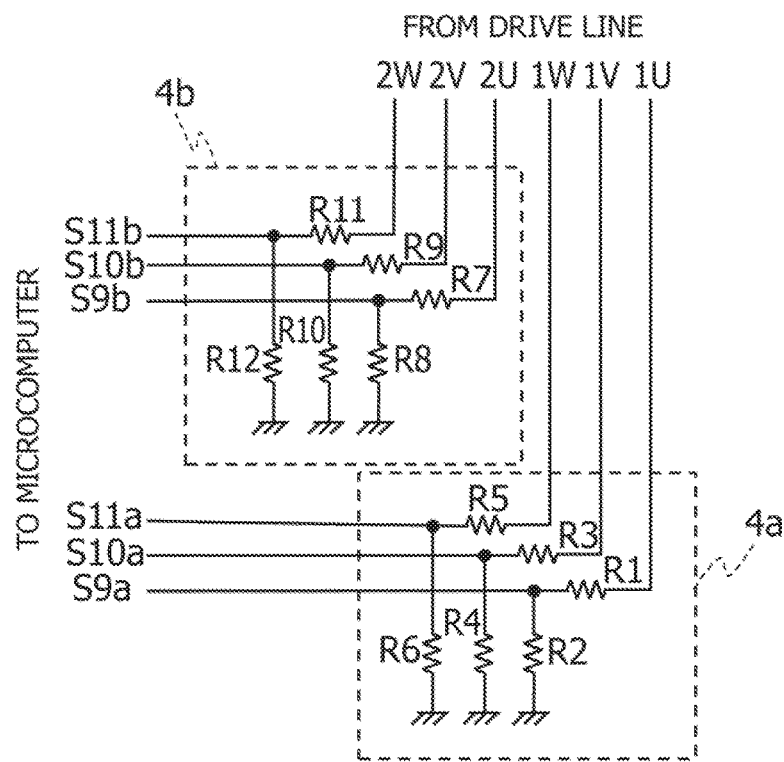
FIG. 4 is a circuit diagram illustrating a configuration example of first and second phase potential detecting circuits of FIG. 1.
Figure 5:
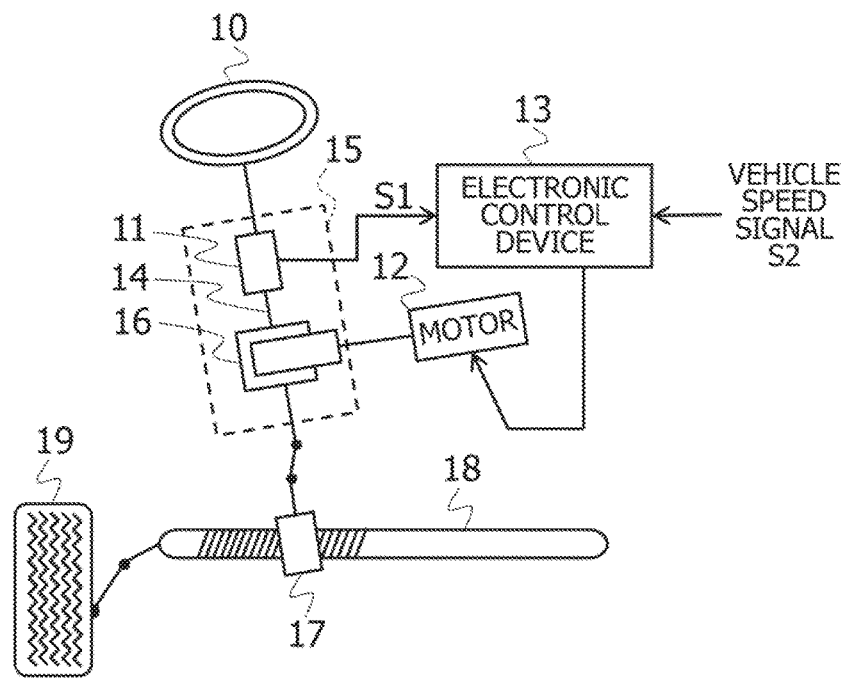
FIG. 5 is a schematic diagram of an electric power steering device to which the electronic control device of FIGS. 1 to 4 is applied.

FIG. 4 illustrates a configuration example of phase potential detecting circuits 4a, 4b of FIG. 1. Phase current detecting circuits 4a, 4b detect potentials of drive lines 1U, 1V, 1W, and drive lines 2U, 2V, 2W from inverter circuits 22a, 22b to coil sets 12a, 12b, respectively, on a phase basis. Phase current detecting circuit 4a is composed of resistors R1, R2, resistors R3, R4, and resistors R5, R6 that are series-connected between drive lines 1U, 1V, 1W and the ground point, respectively. Phase current detecting circuit 4b is composed of resistors R7, R8, resistors R9, R10, and resistors R11, R12 that are series-connected between drive lines 2U, 2V, 2W and the ground point.

Then, the potentials at the nodes between resistors R1 and R2, resistors R3 and R4, and resistors R5 and R6 are input to microcomputer 20 as signals S9a to S11a corresponding to detection potentials of U-phase coil Ua, V-phase coil Va, and W-phase coil Wa of coil set 12a. Also, the potentials at the nodes between resistors R7 and R8, resistors R9 and R10, and resistors R11 and R12 are input to microcomputer 20 as signals S9b to S11b corresponding to detection potentials of U-phase coil Ub, V-phase coil Vb, and W-phase coil Wb of coil set 12b.

Figure 6:
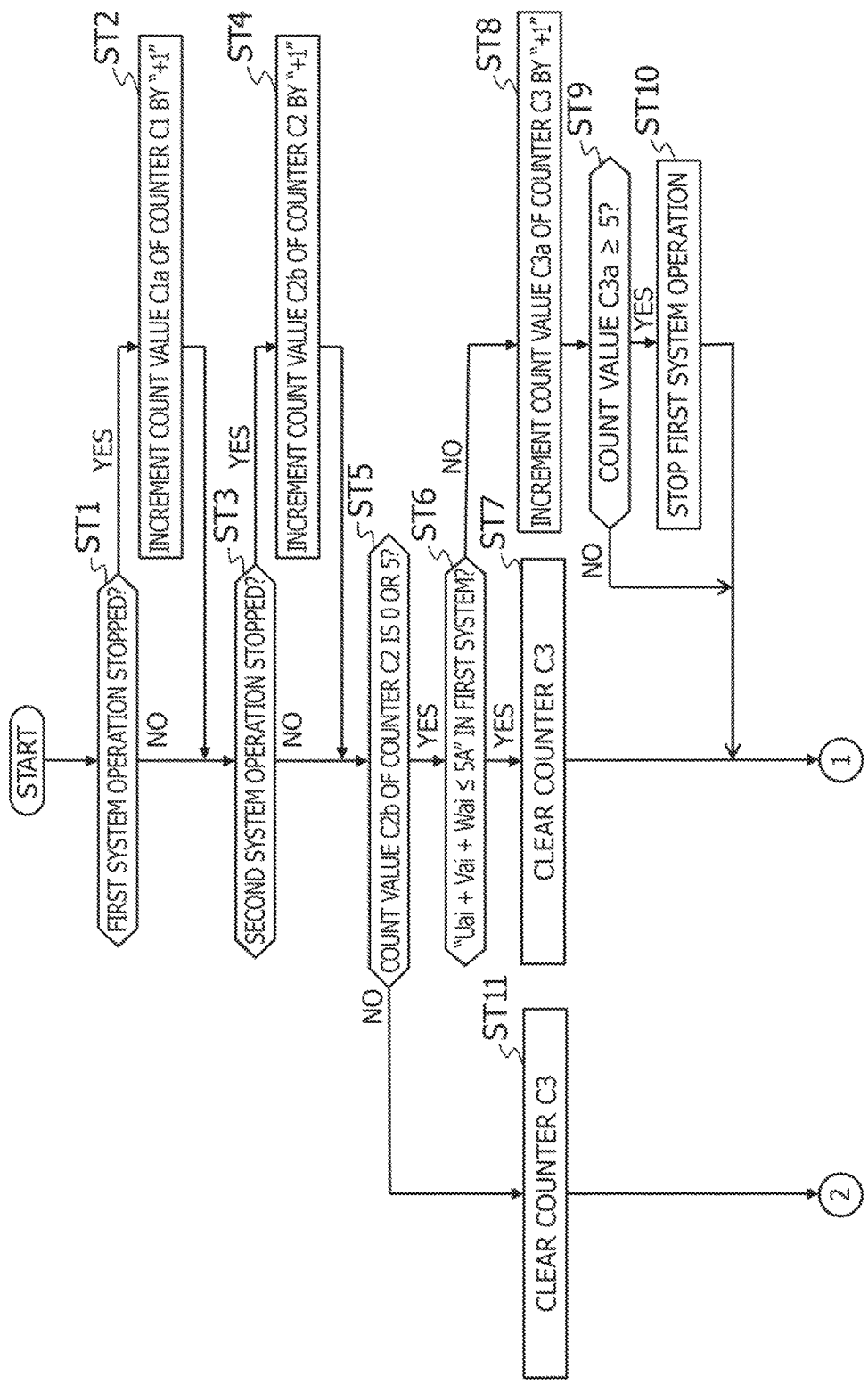
FIG. 6 is a flowchart partially illustrating a control method for the electronic control device according to the first embodiment of the present invention.
Figure 7:
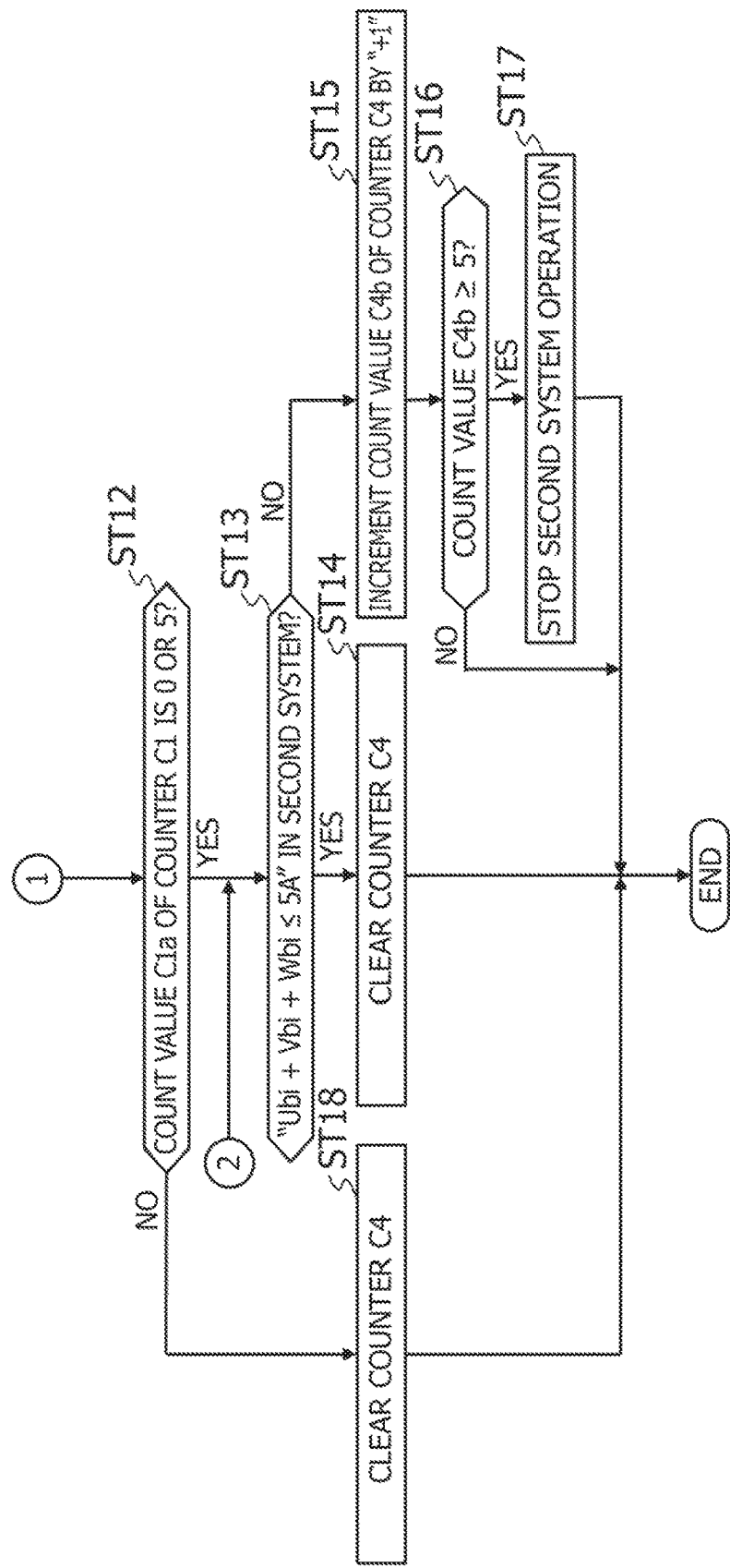
FIG. 7 is a flowchart partially illustrating a control method for the electronic control device according to the first embodiment of the present invention.

Next, referring to flowcharts of FIGS. 6 and 7, a failure diagnosis operation of the electronic control device illustrated in FIGS. 1 to 4 is described. The failure diagnosis operation is started and executed at predetermined time intervals (for example, in milliseconds) during the control of three-phase motor 12. This diagnosis operation is outlined below. That is, a phase of a carrier in the first system is inverted with respect to that in the second system to generate a PWM signal (inverted control signal pulse) for driving inverter circuit 22a. In other words, the carriers of the first and second systems are made out of phase. Under this condition, when all phases are at low level on the current detection side as a target system while all phases are at high level in the other system, current detection (A/D conversion of a detected current value) is carried out.

Conventionally, A/D conversion of a current value has to be carried out within periods Δt1 and Δt2 in which a potential difference appears between PWM signals of the first and second systems as illustrated in FIG. 8A. This causes an increase in load of a controller. In contrast, according to the present invention, as illustrated in FIG. 8B, a phase of the carrier in the first system is inverted. With this, a midpoint t0 in high period of all phases in the first system matches a midpoint t0 in low period of all phases in the second system. At this timing, current must flow into the first system from the second system. Also, since the timing for A/D conversion of detected current, which is often used for control, matches the midpoint t0, if current detection is executed at the same timing to check the sum of current values in three phases, it can be determined whether the system is normal or has failed. Through this diagnosis operation, an intersystem short-circuit can be detected without increasing a processing load of microcomputer 20.

In the diagnosis operation, MOSFETs 31, 33, 35 as upper arm switching elements of all phases in inverter circuit 22a of the first system are turned ON to apply a high potential to first coil set 12a, and MOSFETs 42, 44, 46 as lower arm switching elements of all phases in inverter circuit 22b of the second system to control second coil set 12b to a low potential. In this state, values of currents flowing through current paths of MOSFETs 42, 44, 46 as lower arm switching elements of the inverter circuit 22b of the second system are detected by current detecting circuit 27b. If the sum of values in three phases is a predetermined value or more, it is determined that a current supply failure has occurred between the first and second systems.

Also, the same diagnosis operation as inverter circuit 22a of the first system is executed on inverter circuit 22b of the second system as well.

On the other hand, during the normal operation, current is supplied to three-phase motor 12 from drive circuit 21a of the first system and drive circuit 21b of the second system, and the motor is driven with the added current of two systems in total. In the normal assisted state with drive circuits 21a, 21b of the first and second systems, microcomputer 20 outputs a PWM signal to drivers 23a, 23b. Also, signals for turning ON power supply relays 25a, 25b are output to drivers 26a, 26b. Each H-side driver and each L-side driver in drivers 23a, 23b supply drive signals based on PWM signals to gates of MOSFETs 31 to 36 and 41 to 46 of inverter circuits 22a, 22b of the first and second systems based on the PWM signals so as to selectively control the gates to be ON/OFF.

Then, three-phase motor 12 is driven in three phases by drive circuit 21a via drive lines 1U, 1V, 1W. Moreover, the motor is driven in three phases by drive circuit 21b via drive lines 2U, 2V, 2W. At this time, the duty ratio of the PWM signal is varied based on steering torque signal S1, vehicle speed signal S2, and the like to control an output torque of three-phase motor 12, thereby changing an assist force.

Also, the following determination procedure is executed to avoid such a situation that when detecting a failure at the same time in the first and second systems, the two systems stop operating. First, as illustrated in FIG. 6, it is determined whether the operation of the first system is stopped (step ST1). If the operation is stopped, a count value C1a of a stop transition counter C1 of the first system is incremented by "+1" (step ST2). If the operation is not stopped, it is determined whether the operation of the second system is stopped (step ST3).

If it is determined that the operation of the second system is stopped in step ST3, a count value C2b of a stop transition counter C2 of the second system is incremented by "+1" (step ST4). If the operation is not stopped, it is determined whether count value C2b of stop transition counter C2 of the second system is 0 or 5 (step ST5).

If it is determined that count value C2b is 0 or 5 in step ST5, it is determined whether the sum of U-phase current detection value Uai, V-phase current detection value Vai, and W-phase current detection value Wai in current detecting circuit 27a of the first system is 5 A (5 amp) or less, that is, "Uai+Vai+Wai≤5 A" (step ST6). Then, if "Uai+Vai+Wai≤5 A", an abnormality counter C3 of the first system is cleared (step ST7). If "Uai+Vai+Wai>5 A", a count value C3a of abnormality counter C3 of the first system is incremented by "+1" (step ST8). After abnormality counter C3 of the first system is cleared in step ST7, the processing proceeds to step ST12 of FIG. 7 to determine whether count value C1a of stop transition counter C1 of the first system is 0 or 5.

In step ST9, count value C3a of abnormality counter C3 of the first system satisfies "C3a≥5". If "C3a≥5", the operation of the first system is stopped (step ST10). The operation of the first system is stopped by, for example, turning OFF MOSFETs 31 to 36 of inverter circuit 22a to control the output of inverter circuit 22a to a high impedance. If "C3a<5", the processing proceeds to step ST12.

If it is determined that count value C2b is not 0 or 5 in step ST5 above, abnormality counter C3 of the first system is cleared and the processing proceeds to step ST13 of FIG. 7 (step ST11).

In step ST12, it is determined whether count value C1a of stop transition counter C1 of the first system is 0 or 5. If it is determined that count value C1a is 0 or 5, it is determined whether the sum of U-phase current detection value Ubi, V-phase current detection value Vbi, and W-phase current detection value Wbi in current detecting circuit 27b of the second system is 5 A (5 amp) or less, that is, "Ubi+Vbi+Wbi≤5 A" (step ST13). Then, if "Ubi+Vbi+Wbi≤5 A", abnormality counter C4 of the second system is cleared and the processing is terminated (step ST14).

On the other hand, if "Ubi+Vbi+Wbi>5 A", count value C4b of abnormality counter C4 of the second system is incremented by "+1" (step ST15). In step ST16, it is determined whether count value C4b of abnormality counter C4 of the second system satisfies "C4b≥5". If "C4b≥5", the operation of the second system is stopped and the processing is terminated (step ST17). If "C4b<5", the processing is terminated at this point. The operation of the second system is stopped by, for example, turning OFF MOSFETs 41 to 46 of inverter circuit 22b to control the output of inverter circuit 22b to a high impedance.

If it is determined that count value C1a is not 0 or 5 in step ST12 above, abnormality counter C4 of the second system is cleared and the processing is terminated (step ST18).

When the operation of the first system is stopped in step ST10, microcomputer 20 turns OFF all MOSFETs 31 to 36 of inverter circuit 22a to hold the output at a high impedance and then, executes motor control operation with drive circuit 21b of the second system. Alternatively, it turns OFF phase relays 28U, 28V, 28W so that no drive current is supplied from inverter circuit 22a to coil set 12a.

In contrast, if detecting that the operation of the second system is stopped in step ST17, the microcomputer turns OFF all MOSFETs 41 to 46 of inverter circuit 22b to hold the output at a high impedance and then, executes a motor control operation with drive circuit 21a of the first system. Alternatively, it turns OFF phase relays 29U, 29V, 29W so that no drive current is supplied from inverter circuit 22b to coil set 12b.

The steering assist force generated by either drive circuit 21a or drive circuit 21b is reduced to ½ of that generated by both of them. Nevertheless, since the assist operation can be continued, the degradation in safety, caused by sudden stop of assist operation, can be suppressed.

Note that if it is determined that a power supply failure has occurred, a power supply failure determination, which is executed based on a current value in the other system, is stopped for a predetermined period. Specifically, a diagnosis may be stopped for a predetermined period by turning ON MOSFETs 31, 33, 35 as upper arm switching elements of all phases in inverter circuit 22a of the second system to hold a high potential under control and also, by turning ON MOSFETs 42, 44, 46 as lower arm switching elements of all phases in the first system to hold a low potential under control. Here, the predetermined period indicates the time until the opposing inverter circuit (the other inverter circuit) stops operation and current supply is stopped. In other words, if a failure of the other system is confirmed, the microcomputer waits the predetermined period before confirmation about a failure of own system. After current supply is stopped, the microcomputer may confirm whether own system has failed.

This processing is to A/D convert current values detected at midpoints of low outputs of the first and second systems. Thus, in case of intergate short-circuit, current flows in both directions at some timing and it is detected that a failure has occurred in the respective systems. To avoid such a situation, instead of stopping the two systems, if it is detected that one system has failed, the other system is placed in a standby state. Then, the current values of the first and second systems are detected. If a short-circuit failure has occurred, current flows from the first system to the second system and also from the second system to the first system. Thus, only when an abnormality has been found on the both sides, it is determined that an intergate short-circuit has occurred, and one of the two systems is stopped.

Figure 10:
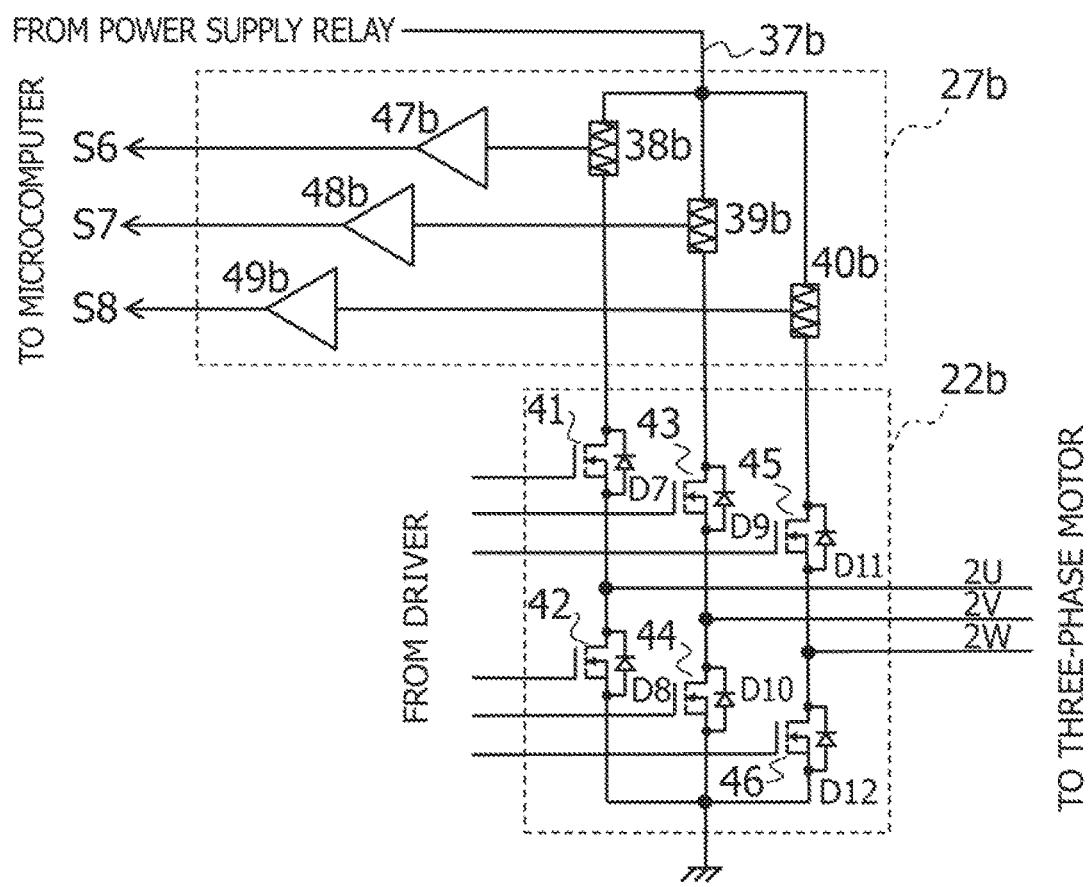
FIG. 10 is a circuit diagram illustrating another configuration example of the inverter circuit of the second system of and the current detecting circuit of FIG. 1.

FIGS. 9 and 10 illustrate another configuration example of inverter circuits 22a, 22b of the first and second systems, and current detecting circuits 27a, 27b thereof illustrated in FIGS. 2 and 3. FIGS. 2 and 3 illustrate a downstream shunt system in which current detecting circuits 27a, 27b are provided between inverter circuits 22a, 22b and the ground point, respectively. In contrast. FIGS. 9 and 10 illustrate an upstream shunt system in which current detecting circuits 27a, 27b are provided between power supply lines 37a, 37b (positive terminals of the power supply) and inverter circuits 22a, 22b, respectively. The other basic configuration is the same as that of FIGS. 2 and 3 and therefore, identical portions are indicated by the same reference symbols and their detailed description is omitted here. In the upstream shunt system of FIGS. 9 and 10, only the timing for current detection is reversed between the upstream shunt system and the downstream shunt system, i.e., basically, the same operation is performed and substantially the same operational effects can be obtained.

As described above, with the electronic control device and control method thereof according to the first embodiment of the present invention, a phase of the carrier of the first system is inverted to generate a PWM signal for driving the inverter circuit, whereby an abnormal current caused by intersystem short-circuit can be reliably detected. Furthermore, since the timing of current detection and subsequent A/D conversion can be the same as the A/D conversion (value at midpoint of low output period) for power supply control, an increase in processing load on the microcomputer can be minimized. Furthermore, if the output of a system that shows an abnormality in the sum of detected currents in three phases is set to a high impedance, current inflow to and outflow from the failed system does not occur even in case of intersystem short-circuit, and power supply control of the remaining system is not hindered, whereby a motor control operation can be continued.

Accordingly, it is possible to provide an electronic control device and a control method thereof, which can detect an intersystem short-circuit without increasing a processing load on a controller.

Second Embodiment

Figure 11:
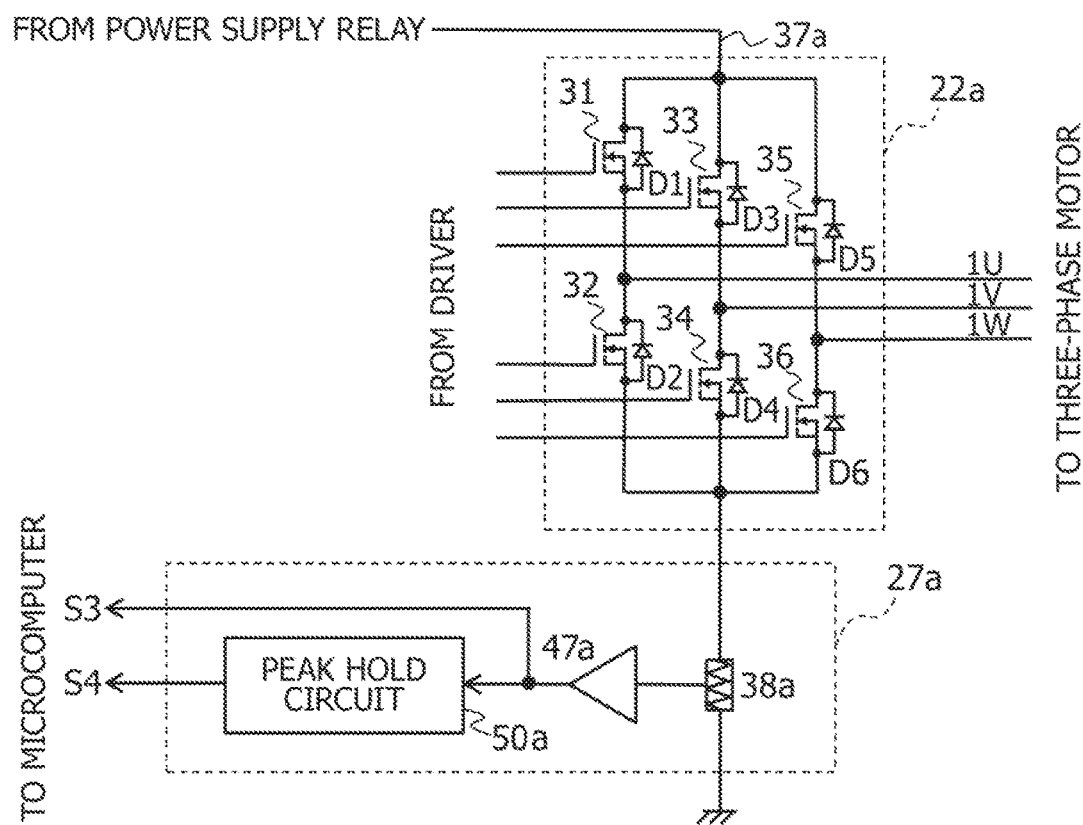
FIG. 11 is a circuit diagram illustrating a configuration example of an inverter circuit of a first system in an electronic control device and a current detecting circuit thereof according to a second embodiment of the present invention.
Figure 12:
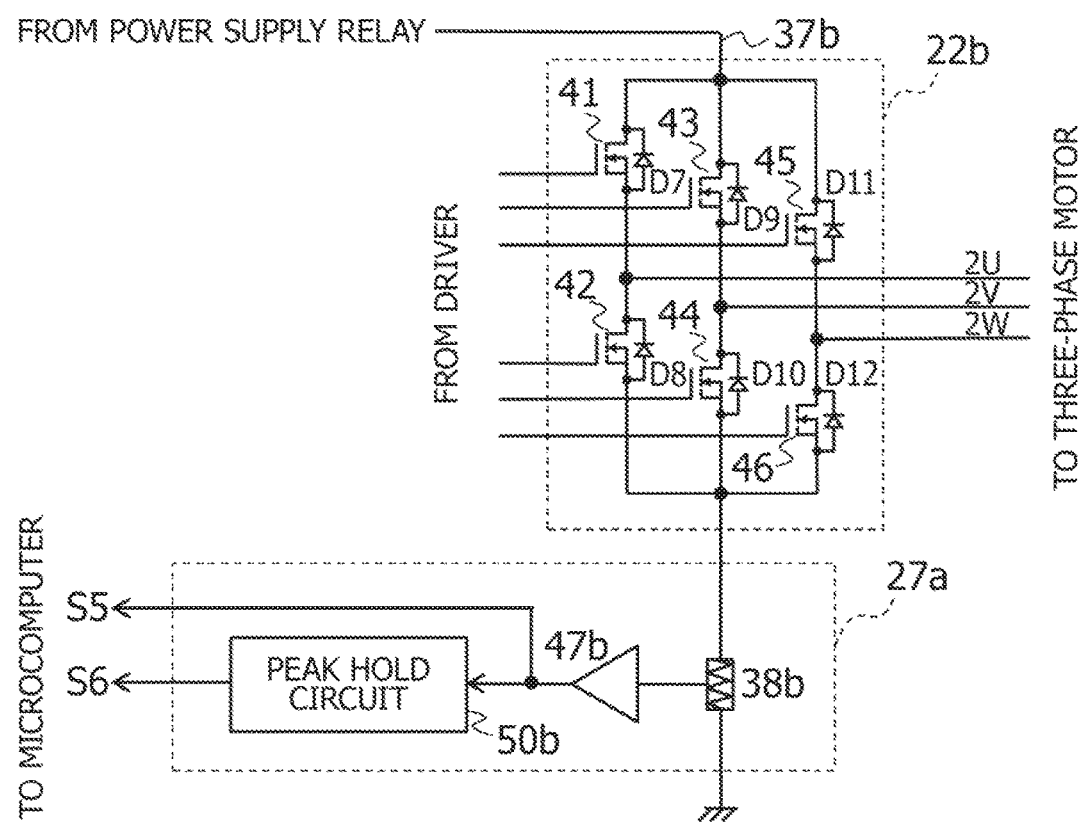
FIG. 12 is a circuit diagram illustrating a configuration example of an inverter circuit of a second system in the electronic control device and a current detecting circuit thereof according to the second embodiment of the present invention.

FIGS. 11 and 12 illustrate an electronic control device according to a second embodiment of the present invention. Specifically, FIGS. 11 and 12 are circuit diagrams illustrating configuration examples of inverter circuits 22a, 22b of the first and second systems in FIG. 1 and current detecting circuits 27a, 27b thereof. In the second embodiment, current detecting circuit 27a is configured of current detecting resistor 38a, buffer 47a, and peak hold circuit 50a, and current detecting circuit 27b is configured of current detecting resistor 38b, buffer 47b, and peak hold circuit 50b.

Specifically, as illustrated in FIG. 11, inverter circuit 22a of the first system has the same configuration as in FIG. 2, and current detecting resistor 38a is connected between inverter circuit 22a and the ground point. A voltage detected by the current detecting resistor 38a is input to buffer 47a. The output of buffer 47a is input to microcomputer 20 as detection signal S3 corresponding to current flowing in inverter circuit 22a and also input to peak hold circuit 50a, and a peak value is input to microcomputer 20 as detection signal S4.

As illustrated in FIG. 12, inverter circuit 22b of the second system has the same configuration as in FIG. 11, and current detecting resistor 38b is connected between inverter circuit 22b and the ground point. A voltage detected by current detecting resistor 38b is input to buffer 47b. The output of buffer 47b is input to microcomputer 20 as detection signal S5 corresponding to current flowing in inverter circuit 22b and also input to peak hold circuit 50b, and a peak value is input to microcomputer 20 as detection signal S6.

Figure 13:
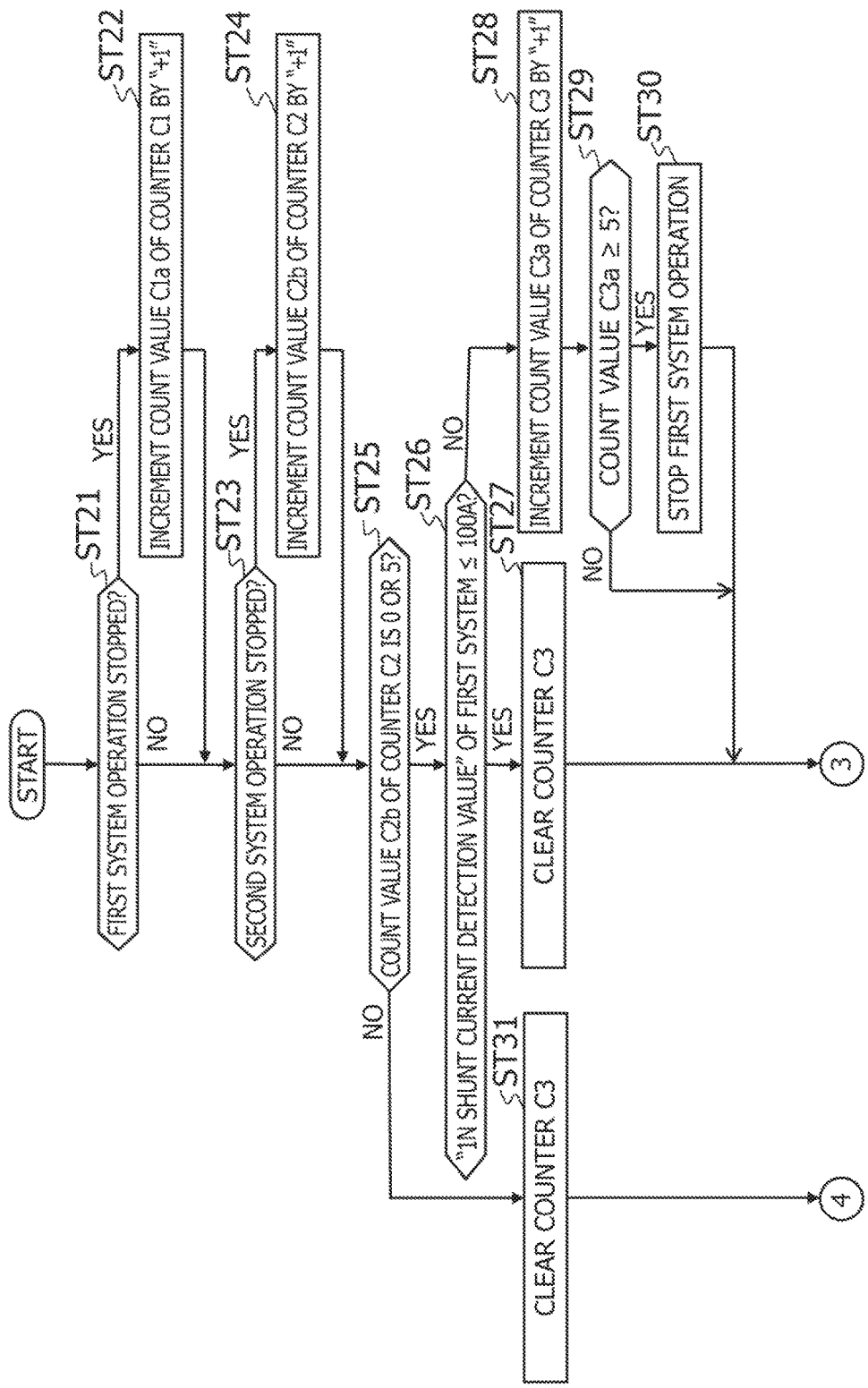
FIG. 13 is a flowchart partially illustrating a control method for the electronic control device according to the second embodiment of the present invention.

Next, a failure diagnosis operation of the electronic control device illustrated in FIGS. 11 and 12 is described with reference to flowcharts of FIGS. 13 and 14. The failure diagnosis operation based on the control method of the second embodiment is started and executed at predetermined time intervals (for example, in milliseconds) during control of the three-phase motor similar to the first embodiment.

In the diagnosis operation, MOSFETs 31, 33, 35 as upper arm switching elements of all phases in inverter circuit 22a of the first system are turned ON to apply a high potential to first coil set 12a and MOSFETs 42, 44, 46 as lower arm switching elements of all phases in inverter circuit 22b of the second system are turned ON to control second coil set 12b to a low potential. In this state, current detecting circuit 27b detects values of currents flowing through current paths of MOSFETs 41, 43, 45 as upper arm switching elements of inverter circuit 22b of the second system and MOSFETs 42, 44, 46 as lower arm switching elements thereof. Then, if a 1N shunt current detection value is a predetermined value or more, it is determined that a power supply failure has occurred between the first and second systems.

First, it is determined whether the operation of the first system is stopped (step ST21). If the operation is stopped, count value C1a of stop transition counter C1 of the first system is incremented by "+1" (step ST22), or otherwise, it is determined whether the operation of the second system is stopped (step ST23).

If it is determined that the operation is stopped in step ST23, count value C2b of stop transition counter C2 of the second system is incremented by "+1" (step ST24), or otherwise, it is determined whether the count value C2b of stop transition counter C2 of the second system is 0 or 5 (step ST25).

If it is determined in step ST25 that count value C2b is 0 or 5, it is determined whether a current detection value (1N shunt current detection value) in current detecting circuit 27a of the first system is 100 A (100 amp) or less (step ST26). Then, if the value is 100 A or less, abnormality counter C3 of the first system is cleared (step ST27), whereas if the value is not 100 A or less, count value C3a of abnormality counter C3 of the first system is incremented by "+1" (step ST28). After abnormality counter C3 of the first system is cleared in step ST27, the processing moves to step ST32 of FIG. 14 to determine whether count value C1a of stop transition counter C1 of the first system is 0 or 5.

In step ST29, it is determined whether count value C3a of abnormality counter C3 of the first system satisfies "C3a≥5", and if "C3a≥5", the operation of the first system is stopped (step ST30). If "C3a≥5" is not satisfied, the processing moves to step ST32.

Figure 14:
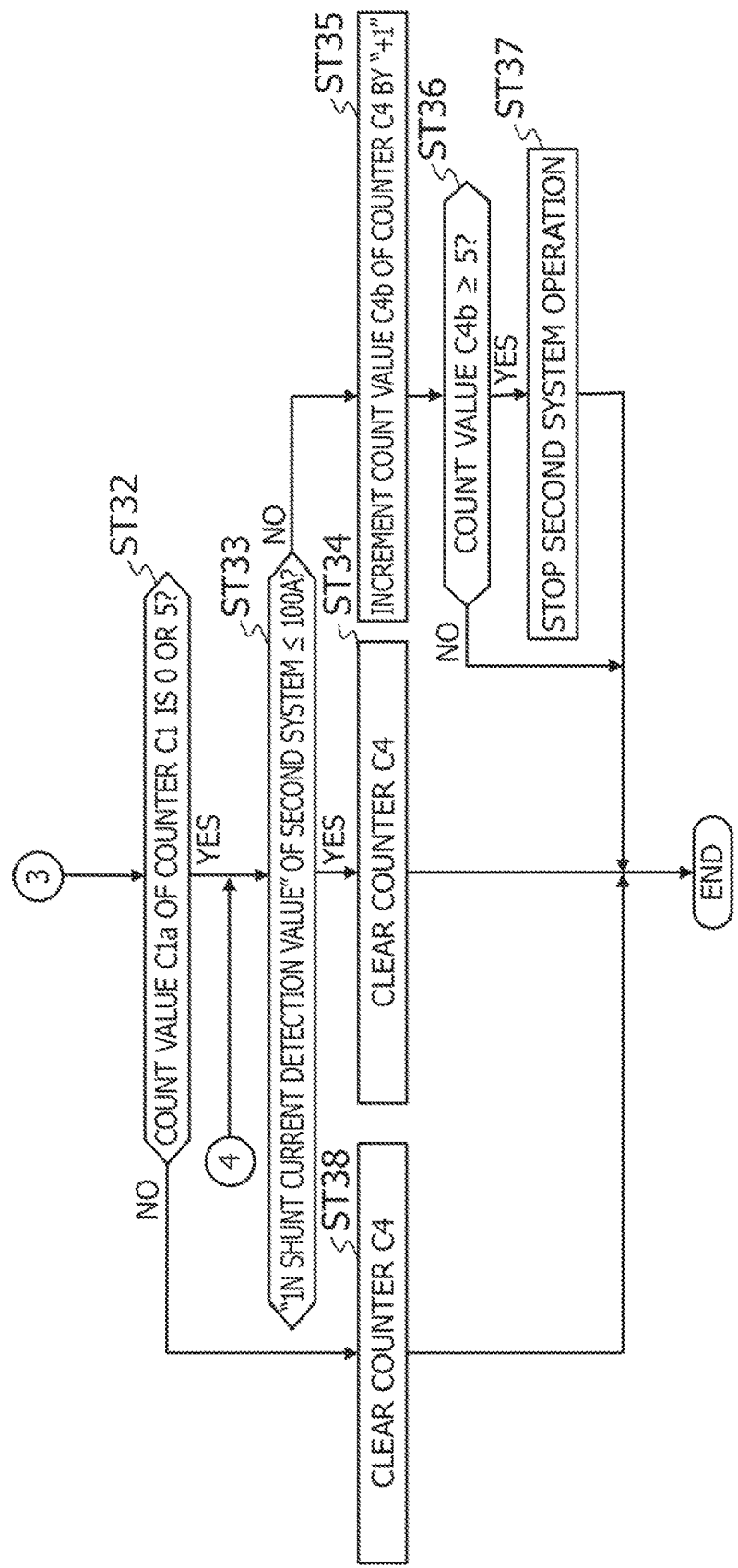
FIG. 14 is a flowchart partially illustrating a control method for the electronic control device according to the second embodiment of the present invention.

If it is determined in step ST25 that count value C2b is not 0 or 5, abnormality counter C3 of the first system is cleared, and the processing moves to step ST33 of FIG. 14 (step ST31).

In step ST32, it is determined whether count value C1a of stop transition counter C1 of the first system is 0 or 5, and if it is determined that count value Ca is 0 or 5, it is determined whether a current detection value (1N shunt current detection value) in current detecting circuit 27b of the second system is 100 A (100 amp) or less (step ST33). Then, if the value is 100 A or less, abnormality counter C4 of the second system is cleared and the processing is terminated (step ST34).

On the other hand, if the value is not 100 A or less, count value C4b of abnormality counter C4 of the second system is incremented by "+1" (step ST35). In step ST36, it is determined whether count value C4b of abnormality counter C4 of the second system satisfies "C4b≥5". If "C4b≥5", the operation of the second system is stopped and then, the processing is terminated (step ST37). If "C4b<5", the processing is terminated at this point.

If it is determined in step ST32 that count value C1a is not 0 or 5, abnormality counter C4 of the second system is cleared and the processing is terminated (step ST38).

When the operation of the first system is stopped in step ST30, microcomputer 20 turns OFF all MOSFETs 31 to 36 of inverter circuit 22a and holds the output at a high impedance and in this state, executes the motor control operation with drive circuit 21b of the second system. Alternatively, it turns OFF phase relays 28U, 28V, 28W not to supply a drive current from inverter circuit 22a to coil set 12a.

In contrast, if it is detected that the operation of the second system is stopped in step ST37, the microcomputer turns OFF all MOSFETs 41 to 46 of inverter circuit 22b and holds the output at a high impedance and in this state, executes a motor control operation with drive circuit 21a of the first system. Alternatively, it turns OFF phase relays 29U, 29V, 29W not to supply a drive current from inverter circuit 22b to coil set 12b.

The steering assist force generated by either drive circuit 21a or drive circuit 21b is reduced to ½ of that generated by both of them. Nevertheless, since the assist operation can be continued, the degradation in safety, caused by sudden stop of assist operation, can be suppressed.

Figure 15:
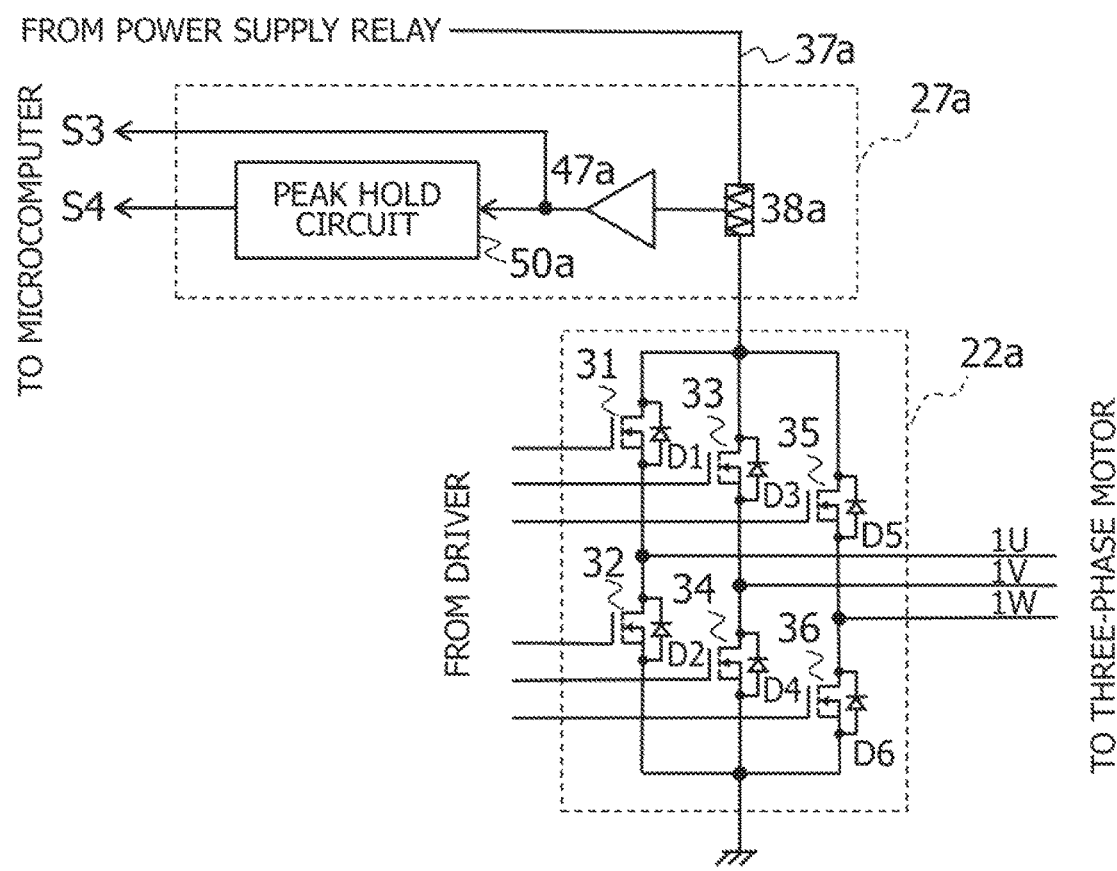
FIG. 15 is a circuit diagram illustrating another configuration example of the inverter circuit of the first system in the electronic control device according to the second embodiment of the present invention and the current detecting circuit thereof.
Figure 16:
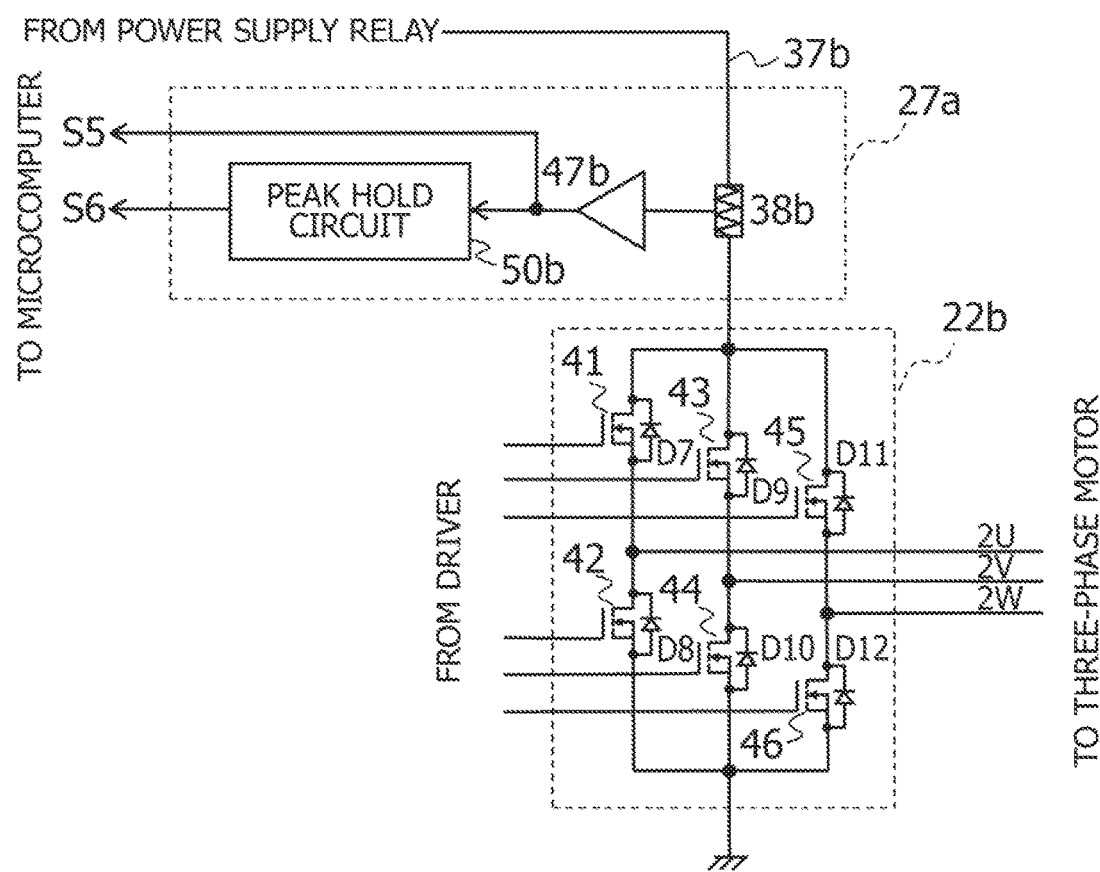
FIG. 16 is a circuit diagram illustrating another configuration example of the inverter circuit of the second system in the electronic control device according to the second embodiment of the present invention and the current detecting circuit thereof.

FIGS. 15 and 16 illustrate another configuration example of inverter circuits 22a, 22b of the first and second systems and current detecting circuits 27a, 27b thereof illustrated in FIGS. 11 and 12, respectively. FIGS. 11 and 12 illustrate a downstream shunt system in which current detecting circuits 27a, 27b are provided between inverter circuits 22a, 22b and the ground point, respectively. In contrast, FIGS. 15 and 16 illustrate an upstream shunt system in which current detecting circuits 27a, 27b are provided between power supply lines 37a, 37b and inverter circuits 22a, 22b, respectively. The other basic configuration is the same as those in FIGS. 11 and 12 and thus, identical portions are indicated by the same reference symbols and their detailed description is omitted here. In the upstream shunt system of FIGS. 15 and 16, only the timing for current detection is reversed between the upstream shunt system and the downstream shunt system, i.e., basically, the same operation is performed and substantially the same operational effects can be obtained.

As described above, the control method for the electronic control device according to the second embodiment of the present invention can also provide substantially the same operational effects as in the first embodiment.

Note that the present invention is not limited to the above first and second embodiments and encompasses various modifications within the gist of the invention.

Modified Example 1

In the above example, the electronic control device is applied to the EPS device. However, it can be applied to any other types of devices or systems for driving a multiphase motor with inverter circuits of the two systems (or plural systems), such as a steer-by-wire device as well as the EPS device.

Modified Example 2

Moreover, in the above example, the inverter circuits of the two systems are controlled by one microcomputer. However, it is also possible to execute control using a microcomputer dedicated to each inverter circuit.

Modified Example 3

In the above example, the electronic control device has the phase relay between each inverter circuit and the coils of the motor. However, the present invention is also applicable to an electronic control device having no phase relay. Also, in the above example, one semiconductor element for the phase relay is provided in each phase. However, the present invention is also applicable to such a configuration that a phase relay has two semiconductor elements with oppositely formed parasitic diodes.

Modified Example 4

Also, in the above example, the carrier for the upper arm switching element in the inverter circuit of the first system is inverted and a center value of the inverted control signal pulse is approximated to a value at midpoint of low potential period of all phases in the inverter circuit of the second system. However, it is possible to take other measures that satisfy the above condition instead of changing a carrier. For example, substantially the same operation effects can be achieved by, for example, setting coil sets 12a and 12b of three-phase motor 12 substantially 180 degrees out of phase. If the coils are substantially 180 degrees out of phase, voltage phases are opposite to each other. Thus, if the voltage (amplitude of the voltage) of the first system increases, that of the second system decreases, whereby a timing of current detection is expanded.

Modified Example 5

Also, in the above example, the Metal Oxide Semiconductor Field Effect Transistor (MOSFET) is used as the switching element in each inverter circuit. The present invention is similarly applicable to other semiconductor elements such as Insulated Gate Bipolar Transistor (IGBT) as well.

Here, technical ideas derived from the above embodiments are described below.

One mode of the present invention is an electronic control device for driving a motor including multiphase coil sets of first and second systems, including inverter circuits of the first and second systems, which include upper arm switching elements and lower arm switching elements which are provided for each of phases of the multiphase coil sets of the first and second systems and selectively controlled to be ON/OFF, in which the upper arm switching elements or lower arm switching elements of all phases in the inverter circuit of the first system are turned ON and the lower arm switching elements or upper arm switching elements of all phases in the inverter circuit of the second system are turned ON, and in this state, it is determined whether a power supply failure has occurred between the first and second systems based on a value of current flowing through the lower arm switching element or upper arm switching element in the inverter circuit of the second system.

According to a preferred mode of the electronic control device, further, the upper arm switching elements or lower arm switching elements of all phases in the inverter circuit of the second system are turned ON and the lower arm switching elements or upper arm switching elements of all phases in the inverter circuit of the first system are turned ON and in this state, it is determined whether a power supply failure has occurred between the first and second systems based on a value of current flowing through the lower arm switching element or upper arm switching element in the inverter circuit of the first system.

According to another preferred mode, a PWM carrier signal for a switching element of the inverter circuit in the first system is substantially 180 degrees out of phase from a PWM carrier signal for a switching element of the inverter circuit in the second system.

According to another preferred mode, the multiphase coil sets of the first and second systems are disposed with a phase difference of substantially 180 degrees in electric angle.

According to still another preferred mode, a current detecting element is provided between a lower arm switching element of at least one phase in each system and a negative terminal of the power supply.

According to still another preferred mode, a current detecting element is provided between a lower arm switching element of each phase in each system and a negative terminal of the power supply.

According to still another preferred mode, a current detecting element is provided between an upper arm switching element of at least one phase in each system and a positive terminal of the power supply.

According to still another preferred mode, a current detecting element is provided between an upper arm switching element of each phase in each system and a negative terminal of the power supply.

According to still another preferred mode, a current detecting element is provided between a motor coil and a node between upper and lower arm switching elements of at least one phase in each system.

According to still another preferred mode, a current detecting element is provided between a motor coil and a node between upper and lower arm switching elements of each phase in each system.

According to still another preferred mode, when it is determined that a power supply failure has occurred, the upper and lower arm switching elements of all phases in the inverter of the first or second system are controlled to be OFF.

According to still another preferred mode, when it is determined that a power supply failure has occurred, the upper and lower arm switching elements of all phases in the inverter of the system that has been determined to have abnormal current, are controlled to be OFF.

According to still another preferred mode, when it is determined that a power supply failure has occurred based on a current value of one of the systems, determination as to a power supply failure based on a current value of the other system is stopped for a predetermined period.

According to a preferred mode of the electronic control device, the multiphase motor is for electric power steering devices or for steer-by-wire control.

To give another aspect, one mode of the present invention is a control method for an electronic control device that drives a motor including multiphase coil sets of first and second systems, and includes inverter circuits of the first and second systems, including upper arm switching elements and lower arm switching elements which are provided for each of phases of the multiphase coil sets of the first and second systems of the motor and selectively controlled to be ON/OFF, the method including the steps of: turning ON the upper arm switching elements or lower arm switching elements of all phases in the inverter circuit of the first system and turning ON the lower arm switching elements or upper arm switching elements of all phases in the inverter circuit of the second system; detecting a value of current flowing through the lower arm switching element or upper arm switching element in the inverter circuit of the second system; and determining whether a power supply failure has occurred between the first and second systems based on the detected value of current.

According to another preferred mode, in the step of determining whether a power supply failure has occurred between the first and second systems, when the detected value of current or the sum of current values in all phases is a predetermined value or more, it is determined that a power supply failure has occurred between the first and second systems.

REFERENCE SYMBOL LIST 1U, 1V, 1W, 2U, 2V, 2W Drive line
4a, 4b Phase potential detecting circuit
6a, 6b Pull up resistor
12 Three-phase motor (multiphase motor)
12a, 12b Coil set
13 Electronic control device
20 Microcomputer (controller)
21a, 21b Drive circuit
22a, 22b Inverter circuit
23a, 23b Driver
25a, 25b Power supply relay
27a, 27b Current detecting circuit
28U, 28V, 28W, 29U, 29V, 29W Phase relay
31 to 36, 41 to 46 MOSFET

The invention claimed is:

1. An electronic control device comprising:
a motor including multiphase coil sets of first and second systems;
inverter circuits of the first and second systems, including upper arm switching elements and lower arm switching elements which are provided for each of phases of the multiphase coil sets of the first and second systems of the motor and selectively controlled to be ON/OFF; and
a controller for controlling inverter circuits of the first and second systems, which turns ON the upper arm switching elements or lower arm switching elements of all phases in the inverter circuit of the first system and turns ON the lower arm switching elements or upper arm switching elements of all phases in the inverter circuit of the second system while determining whether a power supply failure has occurred between the first and second systems based on a value of current flowing through the lower arm switching element or upper arm switching element in the inverter circuit of the second system.

2. The electronic control device according to claim 1, wherein the controller further controls the upper arm switching elements or lower arm switching elements of all phases in the inverter circuit of the second system to be ON and controls the lower arm switching elements or upper arm switching elements of all phases in the inverter circuit of the first system to be ON while determining whether a power supply failure has occurred between the first and second systems based on a value of current flowing through the lower arm switching element or upper arm switching element in the inverter circuit of the first system.

3. The electronic control device according to claim 1, wherein the controller determines that a power supply failure has occurred when a value of current flowing through the lower arm switching element or upper arm switching element is a predetermined value or more.

4. The electronic control device according to claim 1, wherein the controller determines that a power supply failure has occurred when the sum of values of currents flowing through the lower arm switching elements or upper arm switching elements of all phases in each system is a predetermined value or more.

5. The electronic control device according to claim 1, further comprising:

a first current detecting circuit for detecting a value of current flowing through the lower arm switching element or upper arm switching element of the inverter circuit of the first system; and a second current detecting circuit for detecting a value of current flowing through the lower arm switching element or upper arm switching element of the inverter circuit of the second system.

6. The electronic control device according to claim 5, wherein the first current detecting circuit includes a first current detecting element provided between the lower arm switching element of at least one phase in the inverter circuit of the first system and a negative terminal of a power supply or provided between the upper arm switching element of at least one phase and a positive terminal of the power supply, and the second current detecting circuit includes a second current detecting element provided between the lower arm switching element of at least one phase in the inverter circuit of the second system and the negative terminal of the power supply or provided between the upper arm switching element of at least one phase and the positive terminal of the power supply.

7. The electronic control device according to claim 5, wherein the first and second current detecting circuits each include first to third current detecting resistors and first to third buffers for amplifying voltages detected by the first to third current detecting resistors, and an output signal of the buffer is input to the controller.

8. The electronic control device according to claim 5, wherein the first current detecting circuit includes a first current detecting element having one end connected to a node between the upper arm switching element and the lower arm switching element of at least one phase in the inverter circuit of the first system and the other end connected to a coil of the multiphase coil set of the first system, and the second current detecting circuit includes a second current detecting element having one end connected to a node between the upper arm switching element and the lower arm switching element of at least one phase in the inverter circuit of the second system and the other end connected to a coil of the multiphase coil set of the second system.

9. The electronic control device according to claim 5, wherein the first and second current detecting circuits each include a current detecting resistor, a buffer for amplifying voltage detected by the current detecting resistor, and a peak hold circuit to which an output signal of the buffer is input, and output signals of the buffer and the peak hold circuit are input to the controller.

10. The electronic control device according to claim 1, further comprising first and second phase potential detecting circuits for detecting phase potentials of drive lines connected to the multiphase coil sets of the first and second systems of the motor.

11. The electronic control device according to claim 10, further comprising:

a first potential applying circuit for applying and holding an intermediate potential to one of the drive lines connected to the first phase potential detecting circuit; and a second potential applying circuit for applying and holding an intermediate potential to one of the drive lines connected to the second phase potential detecting circuit.

12. The electronic control device according to claim 11, wherein the first potential applying circuit includes a first pull up resistor connected between one of the drive lines connected to the first phase potential detecting circuit and the power supply, and the second potential applying circuit includes a second pull up resistor connected between one of the drive lines connected to the second phase potential detecting circuit and the power supply.

13. The electronic control device according to claim 1, wherein when the controller determines that a power supply failure has occurred, the upper arm switching elements and the lower arm switching elements of all phases in one of the inverter circuit of the first system and the inverter circuit of the second system are turned OFF under control of the controller.

14. The electronic control device according to claim 1, wherein when the controller determines that a power supply failure has occurred, the upper arm switching elements and the lower arm switching elements of all phases in the inverter circuit of the first or second system that has been determined to have abnormal current, are turned OFF under control of the controller.

15. The electronic control device according to claim 1, wherein when the controller determines that a power supply failure has occurred based on a current value of one of the systems, determination as to a power supply failure based on a current value of the other system is stopped for a predetermined period under control of the controller.

16. The electronic control device according to claim 1, wherein a PWM carrier signal for a switching element of the inverter circuit in the first system is substantially 180 degrees out of phase from a PWM carrier signal for a switching element of the inverter circuit in the second system, and the multiphase coil sets of the first and second systems are disposed with a phase difference of substantially 180 degrees in electric angle.

17. The electronic control device according to claim 1, wherein the multiphase motor is for an electric power steering device or for steer-by-wire control.

18. A control method for an electronic control device including a motor including multiphase coil sets of first and second systems, and inverter circuits of the first and second systems, including upper arm switching elements and lower arm switching elements which are provided for each of phases of the multiphase coil sets of the first and second systems of the motor and selectively controlled to be ON/OFF, the method comprising the steps of:

turning ON the upper arm switching elements or lower arm switching elements of all phases in the inverter circuit of the first system and turning ON the lower arm switching elements or upper arm switching elements of all phases in the inverter circuit of the second system;

detecting a value of current flowing through the lower arm switching element or upper arm switching element in the inverter circuit of the second system; and determining whether a power supply failure has occurred between the first and second systems based on the detected value of current.

19. The control method for an electronic control device according to claim 18, wherein in the step of determining whether a power supply failure has occurred between the first and second systems, when the detected value of current is a predetermined value or more, it is determined that a power supply failure has occurred between the first and second systems.

20. The control method for an electronic control device according to claim 18, wherein in the step of determining whether a power supply failure has occurred between the first and second systems, when the sum of the detected values of current in all phases is a predetermined value or more, it is determined that a power supply failure has occurred between the first and second systems.

\* \* \* \* \*